March 8, 1966  W. J. DE FRENNE  3,238,978
DEVICE FOR DISPENSING A VISCOUS SUBSTANCE
Filed May 20, 1963  4 Sheets-Sheet 1
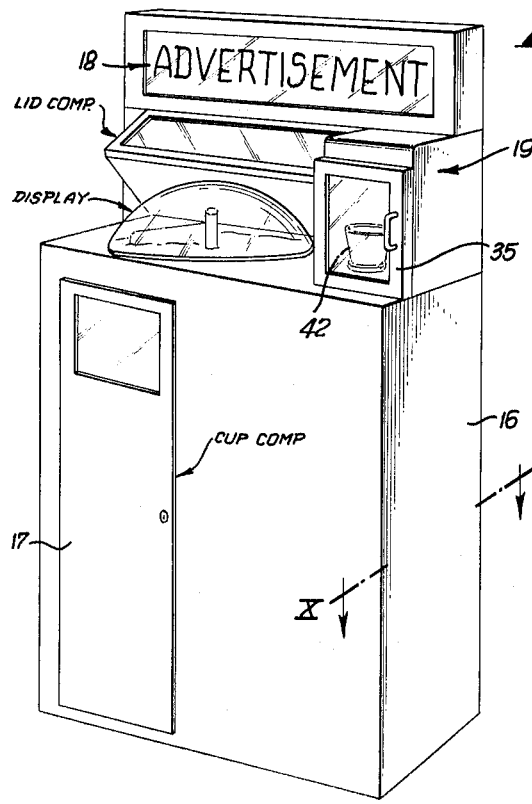
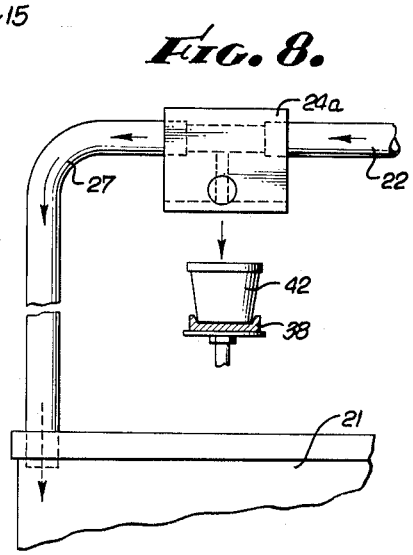
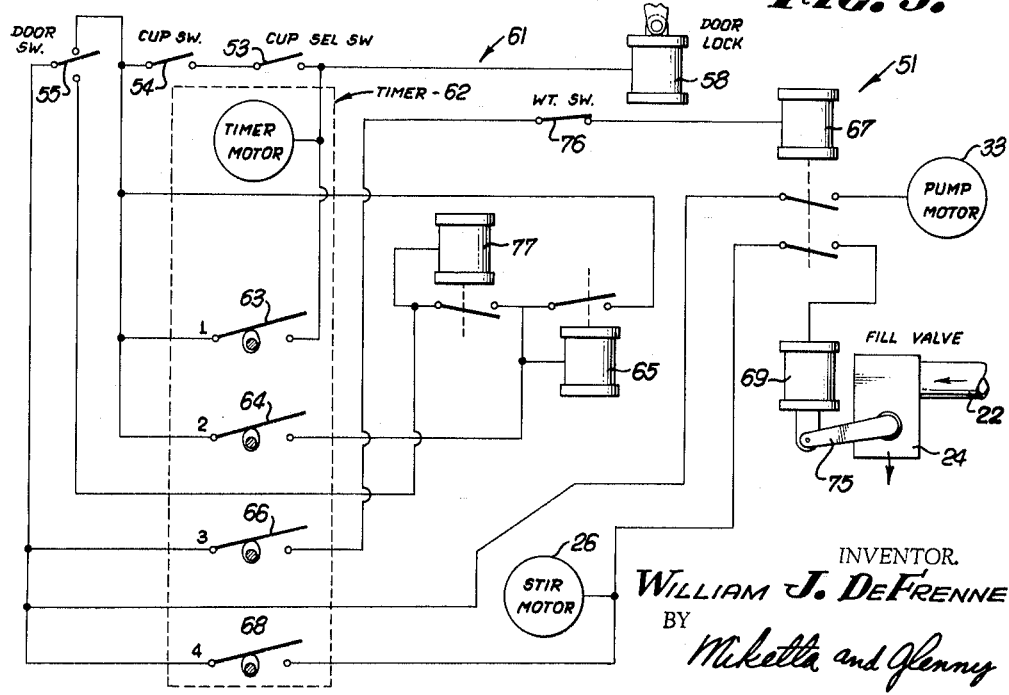
INVENTOR.
WILLIAM J. DeFRENNE
BY
Miketta and Glenny
ATTORNEYS.

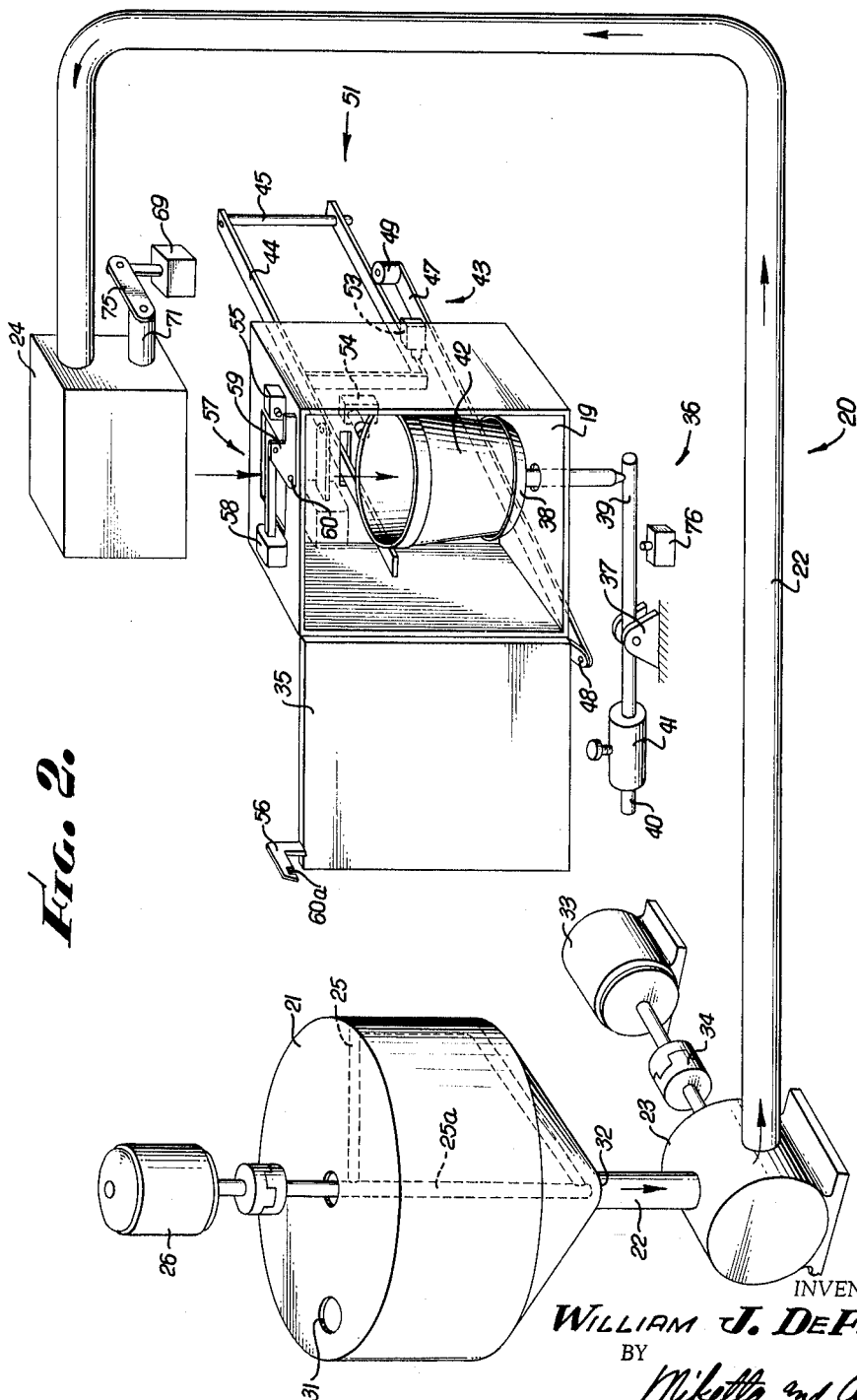

March 8, 1966   W. J. DE FRENNE   3,238,978
DEVICE FOR DISPENSING A VISCOUS SUBSTANCE
Filed May 20, 1963   4 Sheets-Sheet 3
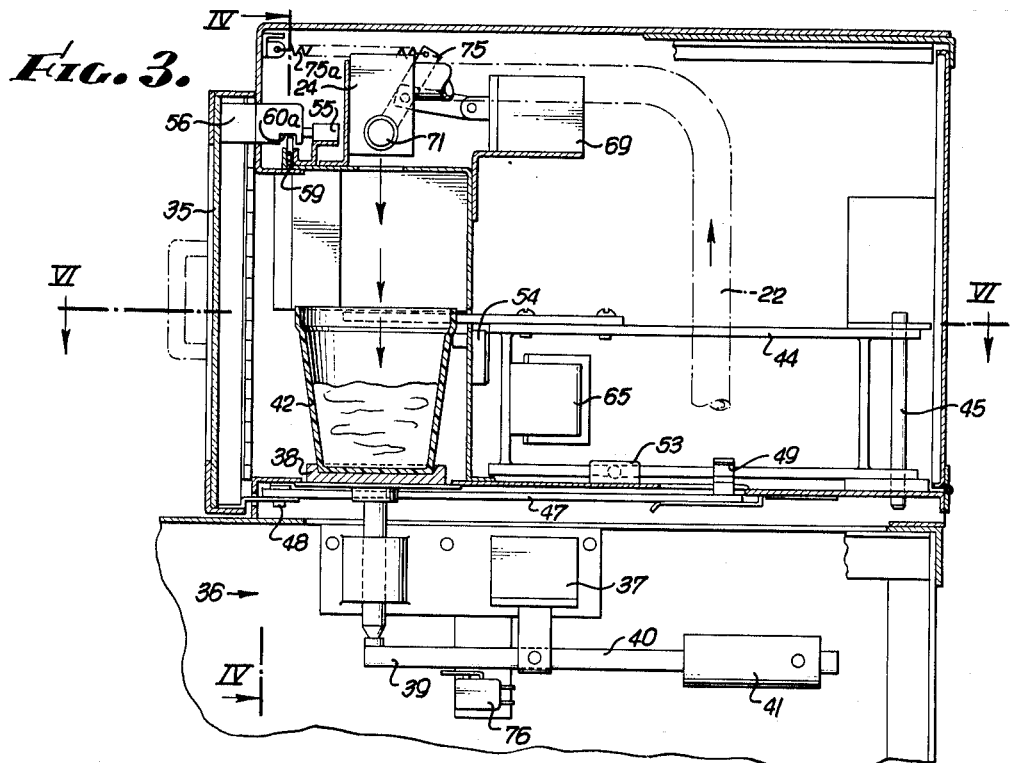
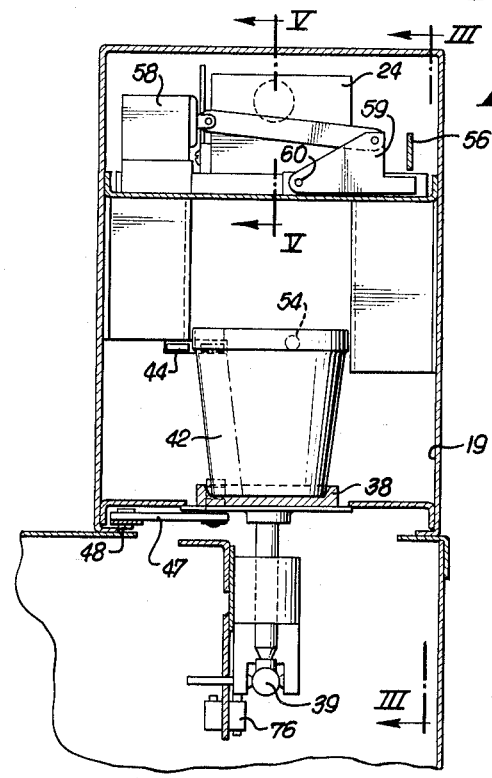
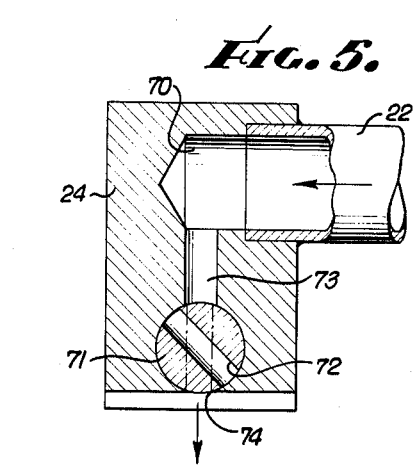
INVENTOR.
WILLIAM J. DE FRENNE
BY
Miketta and Glenny
ATTORNEYS.

March 8, 1966      W. J. DE FRENNE      3,238,978
DEVICE FOR DISPENSING A VISCOUS SUBSTANCE
Filed May 20, 1963      4 Sheets-Sheet 4
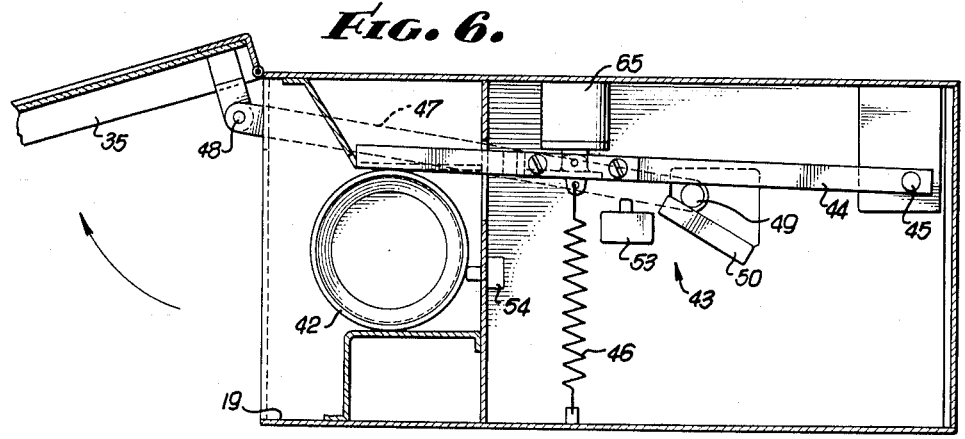
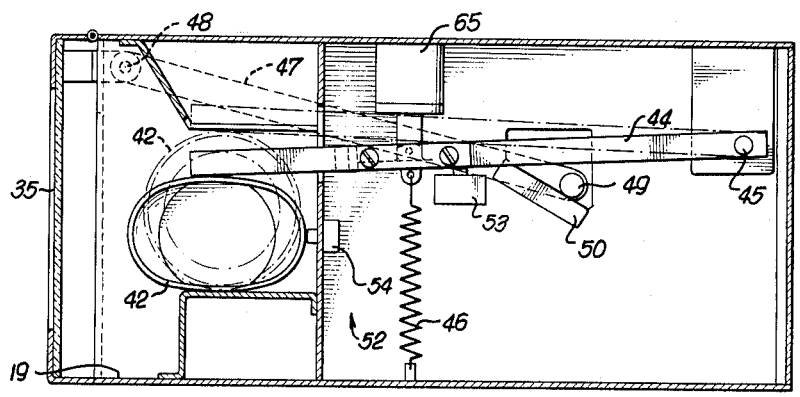
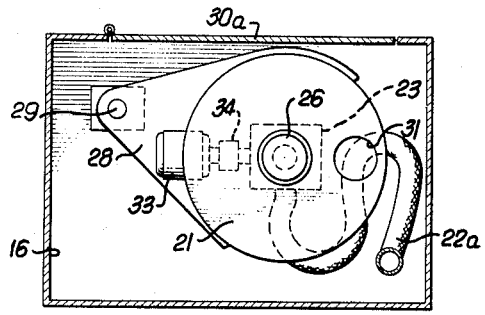
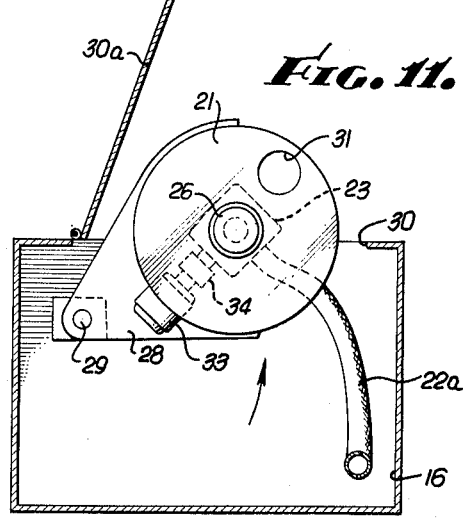
INVENTOR.
WILLIAM J. DE FRENNE
BY
Miketta and Glenny
ATTORNEYS.

United States Patent Office 3,238,978
Patented Mar. 8, 1966

3,238,978
DEVICE FOR DISPENSING A VISCOUS
SUBSTANCE
William J. De Frenne, San Clemente, Calif., assignor, by mesne assignments, to Reddi-Wip, Inc., Los Angeles, Calif., a corporation of Missouri
Filed May 20, 1963, Ser. No. 281,679
10 Claims. (Cl. 141—1)

The present invention relates to a dispensing device and more particularly to a dispensing device for a viscous substance which only fills a properly proportioned container having predetermined characteristics.

In canning and jarring food substances for human consumption the canning industry has come squarely to the problem of satisfying buyers in many ways. Since food must be purchased before it is eaten, the industry has striven to give food substances an appetizing appearance. It has been shown by retailers that many shoppers impulsively buy food substances because the food substances have been presented to them in such a way that their palate is whetted by merely looking at them. To achieve this pleasing and appetizing presentation the canning industry has undertaken to introduce various compounds into the food to give it this appetizing appearance. For example, in canning jams, jellies and preserves, many times an imitation food coloring is added to give the jam or jelly its well known glimmering effect. Then too, in jarring peanut butter, suspending agents are added to maintain the colloidal suspension of the solid matter in the natural peanut oils.

The canning industry has made great strides in reducing the insalubrious effects of these emulsifying, suspending or preserving agents. However, the fact remains that the salubriety of food substances is increased when these agents are completely eliminated and the food substances are eaten fresh.

The device of the present invention may virtually eliminate the need for introducing preservatives or suspending agents into food substance, in that the device may be adapted to be installed in a food market so that a supply of various fresh food substances may be continually available to prospective buyers. The device of the present invention may be adapted to dispense substances which are extremely viscous such as peanut butter, jams and preserves, honey, apple butter and soft ice cream to illustrate but a few.

When other dispensing devices heretofore have been installed in public places several difficulties were encountered. Public operated dispensing devices are always fair gain for mischievious youngsters trying to get more than a proper portion by using larger containers and making the machine dispense for too long a period. In addition, it was common for smaller containers to be improperly used causing overflow and waste. The device of the present invention alleviates these defects with a foolproof safety device which acts to sense whether a properly proportioned container is being used.

The dispensing device of the present invention also utilizes a locking arrangement whereby once a container is placed in position to be filled it cannot be removed until a measured amount of food substance has been dispensed into the container. This avoids the problem of having the device actuated and remain running after the container has been removed spilling the food substance all over the machine and consequently the floor.

The dispensing device of the present invention also has a weight responsive deactuator. After a pre-selected weight of substance has been dispensed the dispenser will automatically shut off. Considering this feature with the aforementioned locking arrangement it will at once be seen that it is important to keep the container in place until the proper weight of substance has been dispensed.

The dispensing device of the present invention is normally manually operated, but it can easily be adapted for coin operation.

The present dispensing device will dispense a predetermined amount of a viscous substance to only a container of proper proportion and characteristic in a foolproof manner without the container being removed before being filled and without waste or mess. The device will always be clean and ready for operation after each container is filled.

Accordingly, it is a general object of the present invention to disclose and provide a viscous substance dispenser that avoids all of the foregoing disadvantages of similar type dispensers used heretofore.

An object of the present invention is to disclose and provide a dispenser that can be installed in food markets to dispense the many fresh food substances that normally are produced as viscous liquids.

Another object of the present invention is to provide a viscous substance dispenser that is tamper-proof so that only a predetermined amount of food substance is despensed into a container having predetermined characteristics.

Still another object of the present invention is to disclose and provide a dispensing device that is actuated only in response to a resilient container having predetermined characteristics being placed in position to be filled.

An object is to provide a food dispensing device which will operate continuously to fill containers with a predetermined amount of food without waste or mess and still be clean after each filling.

Other objects and many of the attendant advantages of this invention will be readily appreciated as the same becomes better understood by reference to the following detailed description when considered in connection with the accompanying drawings wherein:

In the drawings:

FIG. 1 is a front perspective view of the dispensing device of the present invention.

FIG. 2 is a diagrammatic flow diagram of the device of the present invention with a resilient container is position to be filled.

FIG. 3 illustrates a partial side elevation view of the device in section taken along plane III—III of FIG. 4.

FIG. 4 is a partial front elevation view of the container filling chamber of the device in section taken along plane IV—IV of FIG. 3.

FIG. 5 in an enlarged elevational view of an exemplary valve means utilized in the present invention in section taken along plane V—V of FIG. 4.

FIG. 6 is a partial top plan view in section taken along plane VI—VI of FIG. 3 showing a resilient container being inserted into the container filling chamber with the front door open.

FIG. 7 is a partial top plan view similar to FIG. 6 with the front door closed, and the container deformed.

FIG. 8 illustrates a modified form of valve means.

FIG. 9 shows an exemplary schematic electrical circuit that may be used in the device of the present invention.

FIG. 10 is a partial top plan view in section taken along plane X—X in FIG. 1 showing the lower portion of a modified housing which may be used in the device.

FIG. 11 is a partial top plan view similar to FIG. 10 with the reservoir in the lower portion of the modified housing pivoted to a position outside the housing.

Referring now to the drawings, wherein like reference characters designate like or corresponding parts throughout the several views, there is shown in FIG. 1 a viscous substance dispenser 15 having a housing 16 which may include a container storage compartment 17, a display arrangement 18, and a container filling chamber 19.

As best seen in FIG. 2, a supply system 20 may be mounted within housing 16. Such supply system 20 may include a supply reservoir 21 for storing and supplying a viscous substance, such as peanut butter, a supply line or delivery conduit 22 leading from the supply reservoir 21, pump means 23 for pumping a viscous substance from the supply reservoir 21 through the supply line 22 and dispensing valve means 24 for selectively dispensing a viscous substance from the supply line 22.

Rotatably positioned within supply reservoir 21 may be a stirrer 25 including a vertical shaft 25a terminating above supply reservoir 21 and which may be driven by power or motor means 26, to periodically stir the viscous substance stored in the supply reservoir 21.

Valve means 24 may be of the closed end type, wherein valve 24 dispenses all the viscous substance flowing through the supply line 22, as best seen in FIG. 5, or it may be modified to be of the flow through type valve 24a as best seen in FIG. 8 wherein only a portion of the viscous substance flowing through supply line 22 is dispensed. Should the valve means be of the flow through type valve 24a a return conduit 27 may be used to return that portion of the viscous substance not dispensed back to the supply reservoir 21.

Supply reservoir 21 may be rigidly mounted within housing 16 or it may be pivotally mounted therein. Such pivotal mounting may include a lower reservoir support 28 (FIGS. 10 and 11) which may be pivotally mounted to housing 16 by pivot means. Such pivot means may include a vertical pivot shaft 29 rotatably mounted to housing 16 and to the lower reservoir support 28 such that lower reservoir support 28 may be pivoted from a position within housing 16 and through an opening 30 closed by a door 30a, to a position outside housing 16, as best seen in FIGS. 10 and 11. It should also be noted that pump means 23 may also be mounted on lower reservoir support 28.

When supply reservoir 21 is rigidly mounted in housing 16 (FIG. 2), supply line 22 may be rigidly connected to the supply reservoir 21 and may be constructed of some nonflexible material such as aluminum. However, when the supply reservoir 21 is pivotally mounted in the housing 16, as in FIG. 10, supply conduit 22a may be constructed of a flexible material such as plastic tubing or synthetic rubber so as to permit the free pivotal movement of the supply reservoir 21 without the necessity of disconnecting the supply line 22a from the reservoir 21.

Supply reservoir 21 may have an inlet 31 as best seen in FIGS. 2 and 10. Such inlet 31 may be used when replenishing the supply of viscous substance within the supply reservoir 21, and it may also be used to receive return conduit 27 when the modified valve means 24a is used. Supply reservoir 21 may also have an outlet 32 to which the supply line 22 may be attached.

Therefore, a viscous substance may be pumped out of supply reservoir 21 by pump means 23, which may be driven by power or motor means 33 and through the supply line 22 and is dispensed by dispensing valve means 24. It should be noted that transmission or clutch means 34 may be used to transmit the power from the power means 33 to pump means 23; and any well known type power transmission means may be used. It should also be noted that power means 26 may be replaced by appropriate transmission means (not shown) leading from power means 33 to vertical shaft 25a so that the stirrer is operated only when power means 33 is driving pump means 23.

Housing 16 may also include a container filling chamber 19 which may have a front control door 35. Container filling chamber 19 may have container receiving means 36 positioned therein in operable position with respect to dispensing valve means 24.

Such container receiving means 36 may include a container scale 37 which may have a scale pan or holder 38 connected to one arm 39 of scale 37. The other arm 40 of container scale 37 is provided with an adjustable, counterbalancing predetermined weight 41. Scale 37 is adapted to determine when a preselected weight has been placed on scale pan 38. Scale pan 38 is adapted to receive a container 42 in operable position to receive a viscous substance being dispensed by dispensing valve means 24 as best seen in FIG. 2.

Container filling chamber 19 may also include container sensing means 43 operably positioned within the device 15 to sense the presence on scale pan 38 of a properly proportioned container 42 having predetermined characteristics. Such sensing means 43 may include a container sensing arm 44 pivotally mounted on the housing 16 as by hinge pin 45 and projecting into the container filling chamber 19. Container sensing arm 44 is normally biased by spring 46 toward a sensing position as best seen in FIG. 7.

Sensing means 43 may also include a sensing arm actuator 47 which is connected by links to the control door 35 by pivot pin 48. The other end of sensing arm actuator 47 has an upstanding rotatable cylinder 49 rotatably connected thereto which rides between abutment block 50 and container sensing arm 44 (FIGS. 6 and 7).

When control door 35 is open as best seen in FIG. 6, sensing arm actuator 47 is pulled forward wedging cylinder 49 between abutment block 50 and sensing arm 44, thereby opposing spring 46 and rotating sensing arm 44 into a non-sensing or open position. When control door 35 is closed the sensing arm actuator is moved rearward thereby relieving the wedging of rotatable cylinder 49 against sensing arm 44 allowing spring 46 to return sensing arm 44 to the sensing position (in contact with container 42), as best seen in FIG. 7.

Control means 51 may be provided within housing 16 to automatically control the operation of pump means 23 and dispensing valve means 24. Such control means 51 may include selectively adjustable safety means 52 adjacent the container receiving means 36. Such selectively adjustable safety means 52 may include a series of actuating switches as exemplary means for use in a circuit in such control means 51. Container sensing arm switch 53, which may be located behind container filling chamber 19, is actuated by container sensing arm 44 when it rotates into the sensing position when control door 35 is closed (FIGS. 6 and 7). Should a too rigid container 42 be used, container sensing arm 44 will never contact switch 53 due to the inability of spring 46 to overcome the stiffness of the container. When a properly proportioned container 42 is used, the sensing arm 44 will temporarily deform the container 42 to reach and actuate switch 53.

The next switch may be a container actuated switch 54 adapted to be mounted in the rear of container filling chamber 19. This switch 54 may be actuated by the temporary deformation of a properly proportioned container 42. Should a too flexible container be used it will not have the rigidity to actuate switch 54, but may merely collapse around it. If a too rigid container 42 be used, container sensing arm 44 will not deform it enough to actuate switch 54. Therefore, only when a properly proportioned container 42, having predetermined characteristics, is placed on container receiving means 36 and control door 35 is closed, will the switches 53 and 54 be actuated by the container sensing arm 44 and the temporary deformation of container 42.

It should be noted that if container 42 is too short, container sensing arm 44 will pass over the top of it when control door 35 is closed. This virtually foolproof method of sensing the presence of a properly proportioned container 42 insures against using an improper container not having predetermined characteristics of size, resiliency and capacity. Such a container may be selected and used without limiting the requirements of such a container and which will be included in this invention.

The next switch in the series may be a door lock switch 55 which may be mounted near the front of container filling chamber 19. This switch 55 is actuated by an inwardly projecting lug 56 on control door 35 when the control door is closed.

Locking means 57 may be provided on container filling chamber 19 to lock control door 35 in closed position after a properly proportioned container 42 has been placed on container receiving means 36. Such locking means 57 may include a door lock solenoid 58 energized by the simultaneous actuation of switches 53, 54 and 55 which may be connected in series. When solenoid 58 is energized, it operates the catch 59 which is pivotally connected to container filling chamber 19 by a hinge pin 60, thereby rotating the catch 59 up into engagement with the downwardly directed opening 60a in lug 56 on control door 35. Therefore, when a properly proportioned container 42 is placed on scale pan 38 and control door 35 is closed, thereby rotating cup sensing arm 44 to temporarily deform the container, locking means 57 is activated by switches 53, 54 and 55 to lock control door 35 closed until locking means 57 is deactivated.

An exemplary electrical circuit 61 may be used in control means 51, and may include a timing circuit 62 as best seen in FIG. 9. Such timing circuit 62 may include several positions or poles adapted to act either simultaneously or in sequentially timed relation. The first position on the timing circuit may be a holding circuit switch 63 which holds door lock solenoid 58 in the locking position during the operation of the pump means 23 and dispensing valve means 24. The second position on the timing circuit 62 may be a container sensing arm release switch 64. It should be noted that after door 35 is closed and container sensing arm 44 rotated into the sensing position, resilient container 42 is temporarily deformed. In order to fill the resilient container 42 with a viscous substance container 42 should be returned to the undeformed condition.

Therefore, container sensing arm release switch 64 energizes a container sensing arm release solenoid 65 which pulls container sensing arm 44 oppositely of spring 46 and returns container sensing arm 44 to the open position. This permits the dispensing of a viscous substance into an undeformed container. However, it should also be noted that when container sensing arm 44 is in the open position switches 53 and 54 are de-actuated thereby opening the initial circuit which would normally de-energize door lock solenoid 58 and allow door 35 to be opened. But, holding circuit switch 63 by-passes switches 53 and 54 to hold door lock solenoid 58 in the locked position thus permitting container sensing arm 44 to be released without opening the locking circuit.

The next position on timing circuit 62 may be a pump means switch 66 which may energize pump solenoid 67 for operating pump means 23 to begin the flow of a viscous substance through the supply line 22. The next position on timing circuit 62 may be a dispensing valve means switch 68 which energizes valve means solenoid 69 for opening valve means 24 into the dispensing position.

The valve means 24 should dipsense viscous substance quickly, positively and should not drip when cut-off. Such dispensing valve means 24 may therefore include an inlet port 70 as best seen in FIG. 5, a rotatable core 71 having a laterally extending through bore 72, a downwardly directed bore 73 communicating the inlet port 70 with laterally extending through bore 72 when core 71 is rotated into a dispensing position, and a downwardly directed discharge port 74. To prevent dripping of the viscous substance when the core 71 is closed, the edges of discharge port 74 may be ground to a fine knife edge to provide a clean cut off. As best seen in FIGS. 2 and 9, core 71 is pivotally connected to valve means solenoid 69 by link arm 75 which rotates core 71 when solenoid 69 is energized. Normally core 71 is biased toward the non-dispensing position by spring 75a.

Control means 51 may also include a deactivating circuit which deactivates the entire device. Such deactivating circuit may include weight responsive cut off switch 76 as best seen in FIGS. 2 and 3. Switch 76 is actuated by container scale 37 to de-energize pump solenoid 67 and valve solenoid 69 to shut off the entire device and open door lock solenoid 58 to allow door 35 to be opened. Normally, when control door 35 is opened, container sensing arm 44 rotates into the sensing position thereby temporarily deforming container 42 even after it has been filled with a viscous substance. Therefore, the deactivating circuit may also include a container sensing arm holding solenoid 77 (FIG. 9) which may be energized by switch 76 to hold container sensing arm 44 in the open position after container 42 is filled until control door 35 has been opened to remove container 42 from container filling chamber 34. This prevents container sensing arm 44 from deforming the filled container which would force some of the viscous substance out of the container.

To fill a container with a viscous substance using the device of the present invention, a container 42 having the proper proportions and predetermined characteristics is first taken from container storage compartment 17. Control door 35 is then opened and container 42 is placed in container filling chamber 34 on scale pan 38 which is part of container receiving means 36. As control door 35 is closed, container sensing arm actuator 47 is forced rearward allowing container sensing arm 44 to rotate toward the sensing position temporarily deforming container 42. When container sensing arm 44 reaches the sensing position, it mechanically actuates switch 53, and the deformed portion of container 42 actuates switch 54 almost simultaneously. When control door 35 reaches the closed position lug 56 actuates switch 55. When switches 53, 54 and 55, which may be aligned in series, are actuated, door lock solenoid 58 is energized which operates to lock control door 35 in the closed position. Simultaneously with the energization of door lock solenoid 58, the timer circuit 62 may also be actuated by switches 53, 54 and 55.

Timer circuit 62 then takes over to operate the pump means 23 and valve means 24. Switch means 63 is first actuated to hold door lock solenoid 58 in the locking position. Switch means 64 is next actuated to energize container sensing arm release solenoid 65 which rotates container sensing arm 44 into the open position leaving an undeformed container 42 ready to be filled. Switch means 66 is then actuated to energize pump means solenoid 67 to start pump means 23. Next, switch means 68 is actuated to energize valve means solenoid 69, which rotates core 71 of valve means 24 into the dispensing position. A viscous substance is then pumped out of supply reservoir 21 by pump means 23, through supply line 22 and into valve means 24 which dispenses the viscous substance into container 42.

After a preselected weight of viscous substance has been dispensed into container 42, container scale 37 is tipped into an unbalanced condition actuating shut off switch 76. Shut off switch 76 de-energizes pump means solenoid 67 and valve means solenoid 69 to shut off pump means 23 and rotate core 71 of valve means 24 into the closed position. The holding circuit is then broken and door lock solenoid 58 is de-energized allowing control door 35 to be opened and the filled container 42 removed from container filling chamber 34. This entire operation only requires a minimum of time on the order of seconds and not more than a few minutes.

It should be noted that a double safety means has been incorporated into the present device. First, the device is shut off after a preselected weight of viscous substance has been dispensed. Secondly, by utilizing a timing circuit the device is de-activated after a certain period of time (for example 20 seconds) has elapsed whether or or not the preselected weight of viscous substance has been dispensed.

Obviously, many modifications and variations of the present invention are possible in the light of the above teachings. It is therefore to be understood that within the scope of the appended claims the invention may be practiced otherwise than so specifically described.

I claim:

1. A device for dispensing a viscous substance from a closed reservoir which has an upper inlet and a lower outlet, comprising:
   a housing including a lower reservoir support, pivot means mounting said support on said housing for movement between a position within the housing to a position outside of said housing, and a front control door;
   a supply system having a return conduit connected to the reservoir inlet and a delivery conduit connectible to the reservoir outlet, a dispensing valve means connecting said delivery and return conduits, pump means mounted on said support and connected in said delivery conduit;
   a container scale mounted on said housing having a holder at said control door for receiving a container in position to be filled by a viscous substance emitted from said dispensing valve means; and
   control means for automatic operation including first means responsive to the resiliency and size of a contained on said holder and said control door being in closed position to actuate said pump means and open said dispensing valve means, second means responsive to predetermined position of said scale when said container is filled to close said dispensing valve means and stop said pump means.

2. A device as stated in claim 1 and including a motor mounted on said housing for driving said pump means, and transmission means, and wherein said pivot means is a vertical shaft rotatably mounted in said housing, said transmission means being connected to and transmitting power from said motor to the upper end of said shaft and from the lower end to the shaft to the pump means to enable free pivotal movement of said support.

3. A device for dispensing a viscous substance comprising:
   a closed reservoir having an upper inlet and a lower outlet and a rotatable stirrer therein with the upper end of its shaft terminating above the top of the reservoir;
   a housing including a lower reservoir support, pivot means including a rotatable vertical shaft mounting said support on said housing for movement between a position within the housing to a position outside of said housing, an upper frame member and a front control door;
   a supply system having a return conduit releasably connected to said reservoir inlet and a delivery conduit releasably connected to said reservoir outlet, a dispensing valve means connecting said delivery and return conduits, a pump means mounted on said support and connected in said delivery conduit;
   a container scale mounted on said housing having a holder at said control door for placing a container in position to be filled by a viscous substance emitted from said dispensing valve means;
   power means mounted on said upper frame member for driving said pump means and having a releasable connection for rotating said upper end of said shaft of said stirrer in said reservoir, transmission means connecting said power means to said upper end of said vertical shaft and the lower end of said vertical shaft to said pump means; and
   control means for automatic operation including first means responsive to the resiliency and size of a container on said holder and said control door in closed position to actuate said pump means and open said delivery valve means, second means responsive to a predetermined position of said scale when said container is filled to close said dispensing valve means and stop said pump means.

4. A device for dispensing a viscous substance, comprising:
   a supply system including a reservoir, a supply line leading therefrom, pump means for pumping a viscous substance from said reservoir through said supply line, and dispensing valve means for selectively emitting a viscous substance from said supply line;
   a container filling chamber having a door, said chamber including means for receiving and positioning a resilient container in position with respect to said dispensing valve means; and
   control means adjacent said container filling chamber for actuating said pump means and said valve means, said control means acting in response to a resilient container properly positioned and deformed in said chamber.

5. A device for dispensing a viscous substance, comprising:
   a supply reservoir for supplying a viscous substance;
   filling means for supplying a viscous substance to a container of predetermined size, resiliency and capacity characteristics;
   conduit means between said reservoir and said filling means for allowing a viscous substance to flow from said supply reservoir to said filling means;
   container receiving means operatively positioned with respect to said filling means and adapted to receive a container for receiving a viscous substance from said filling means; and
   control means connected to said reservoir and said filling means for controlling the flow of viscous substance from the reservoir through said filling means, said control means including a switch means adjacent said container receiving means and operable only by a container of said predetermined characteristics on said container receiving means.

6. In a device for dispensing a viscous substance the provision of:
   a container receiving means for receiving a resilient container;
   a container sensing means adjacent said container receiving means for sensing the presence of a container on said container receiving means and temporarily deforming said resilient container; and
   control means adjacent said sensing means and actuated in response to the temporary deformation of the container for controlling said device.

7. In a device for dispensing a viscous substance the provision of:
   a container filling chamber having a container receiving means therein for receiving a resilient container, said chamber having a front control door;
   a spring biased container sensing arm pivotally mounted outside said chamber and projecting into said chamber, said sensing arm being pivotally connected to said control door whereby said arm is moved into a sensing position to temporarily deform the resilient container when said control door is closed;
   control means adjacent said sensing arm and actuated in response to the temporary deformation of the container for controlling the actuation of the device.

8. The method of filling a container which is of a predetermined capacity, resiliency and rigidity, comprising the steps of:
   temporarily deforming said container by exerting lateral pressure thereto;
   actuating a filling switch by the deformed portion of the container;
   filling said container with a substance;
   releasing said lateral pressure to allow said container to return to its undeformed condition prior to the filling thereof.

9. A device for dispensing a viscous substance, comprising:
a supply reservoir for supplying a viscous substance;
filling means for supplying a viscous substance to a container of predetermined size, resiliency and capacity characteristics;
conduit means between said reservoir and said filling means for allowing a viscous substance to flow from said supply reservoir to said filling means;
container receiving means operatively positioned with respect to said filling means and adapted to receive a container for receiving a viscous substance from said filling means; and
control means connected to said reservoir and said filling means for controlling the flow of viscous substance from the reservoir through said filling means, said control means including a switch means adjacent said container receiving means and operable only by a container of predetermined characteristics on said container receiving means, and selectively adjustable safety means adjacent said container receiving means for engaging and deforming a container of predetermined characteristics on said container receiving means to deform the container into contact with said switch means, whereby said control means will be actuated by said switch means to control said filling means.

10. A device for dispensing a viscous substance, comprising:
a supply reservoir for supplying a viscous substance;
filling means for supplying a viscous substance to a container of a predetermined size, resiliency and capacity characteristics;
conduit means between said reservoir and said filling means for allowing a viscous substance to flow from said supply reservoir to said filling means;
container receiving means operatively positioned with respect to said filling means and adapted to receive a container for receiving a viscous substance from said filling means; and
control means connected to said reservoir and said filling means for controlling the flow of viscous substance from the reservoir through said filling means, said control means including a switch means adjacent said container receiving means and operable only by a container of predetermined characteristics on said container receiving means, and selectively adjustable safety means adjacent said container receiving means for engaging and deforming a container of predetermined characteristics on said container receiving means to deform the container into contact with said switch means, whereby said control means will be actuated by said switch means to control said filling means;
said selectively adjustable safety means comprising;
a container filling chamber surrounding said container receiving means, said chamber having a front control door;
a spring biased container sensing arm pivotally mounted and projecting into said chamber, said sensing arm being pivotally connected to said control door whereby said arm is moved into a sensing position when said control door is closed.

References Cited by the Examiner
UNITED STATES PATENTS

| | | | |
|---|---|---|---|
| 1,746,597 | 2/1930 | Lind | 141—83 |
| 2,333,232 | 11/1943 | Bleam et al. | 141—161 X |
| 2,778,387 | 1/1957 | Diehl | 141—83 X |
| 3,055,403 | 9/1962 | Barresi | 141—284 |

LAVERNE D. GIEGER, *Primary Examiner.*